United States Patent
Baranowski

[19]
[11] Patent Number: 6,073,619
[45] Date of Patent: Jun. 13, 2000

[54] AIR/FUEL ENGINE FEEDBACK CONTROL SYSTEM AND METHOD

[75] Inventor: Peter Phillip Baranowski, Newtown, Australia

[73] Assignee: Ford Global Technologies, Inc., Dearborn, Mich.

[21] Appl. No.: 09/131,597

[22] Filed: Aug. 10, 1998

[51] Int. Cl.⁷ .................................................. F02D 41/14
[52] U.S. Cl. .................... 123/681; 123/527; 123/575; 123/687; 123/696
[58] Field of Search ........................ 123/527, 681, 123/683, 684, 687, 696, 575, 576, 577, 578, 679

[56] References Cited

U.S. PATENT DOCUMENTS

| | | | |
|---|---|---|---|
| 3,900,012 | 8/1975 | Wahl et al. ........................... | 123/687 |
| 4,461,258 | 7/1984 | Becker et al. ....................... | 123/696 X |
| 4,922,862 | 5/1990 | Casacci .............................. | 123/575 X |
| 5,377,646 | 1/1995 | Chasteen ............................ | 123/527 |
| 5,450,832 | 9/1995 | Graf ................................... | 123/525 X |
| 5,533,492 | 7/1996 | Willey et al. ....................... | 123/687 X |
| 5,588,416 | 12/1996 | Suzuki et al. ...................... | 123/687 X |
| 5,941,223 | 8/1999 | Kato .................................. | 123/696 X |
| 6,026,787 | 2/2000 | Sun et al. ........................... | 123/575 X |

*Primary Examiner*—Tony M. Argenbright
*Attorney, Agent, or Firm*—Allan J. Lippa

[57] ABSTRACT

A fuel delivery control system suitable for use with internal combustion engines fueled by liquid propane gas or the like. A stepper motor actuated control valve 52, under the control of a closed-loop fuel control logic routine, meters the desired fuel delivery rate. The stepper motor 50 is initially positioned based on an open-loop value related to the given engine speed and load. The stepper motor position is thereafter controlled by a calibrateable function having engine speed as its input.

15 Claims, 8 Drawing Sheets

AIR/FUEL ENGINE FEEDBACK CONTROL SYSTEM AND METHOD

TECHNICAL FIELD

The invention relates generally to methods and apparatus for controlling the delivery of fuel to an internal combustion engine, and more particularly to a system and method for optimizing the amount of liquid propane gas delivered to the engine in response to engine speed and exhaust gas oxygen sensor feedback.

BACKGROUND

Electronic fuel control systems are used in internal combustion engines to precisely meter the amount of fuel required for varying engine requirements. Such systems vary the amount of fuel delivered for combustion in response to multiple system inputs, including the concentration of oxygen in the exhaust gas produced by combustion of air and fuel. Typical electronic fuel control systems operate in closed-loop mode responsive to sensed exhaust gas oxygen levels in order to maintain the ratio of air and fuel at or near stoichiometry for purposes of reducing undesirable exhaust emissions, particularly in connection with a catalytic converter.

Conventional fuel control systems, however, are designed for use in vehicles powered by liquid fuels such as gasoline, ethanol, methanol, or mixtures thereof. Such systems are not readily adaptable for use in vehicles powered by non-conventional fuels, such as liquid propane gas (LPG), or compressed natural gas.

Liquid propane gas powered vehicles are desirable, however, because of their reduced fuel costs. Presently, LPG is available for approximately one-third the cost of gasoline.

Although LPG powered vehicles cost less to operate than conventional fueled vehicles, presently available LPG engine control systems are prone to back-firing. To reduce sensitivity to back-firing, the air/fuel mixture of existing systems must be adjusted on the rich side of stoichiometry. As a result, fuel economy and engine performance suffer, and emission levels increase.

SUMMARY OF THE INVENTION

The present invention is directed to providing an improved system for controlling the delivery of a gas-type fuel to an internal combustion engine. More specifically, an object of the present invention is to provide an improved stable closed-loop stoichiometric control of a liquid propane gas powered engine.

It is another object of the present invention to provide an improved engine fuel control system that provides for reduced or acceptable emissions, improved fuel economy, and adequate power and torque from the engine.

The above objects are achieved by providing a method and apparatus for controlling gas-type fuel delivered to an internal combustion engine in response to the engine speed and exhaust gas oxygen sensor output. In one embodiment, the method of the present invention comprises the steps of generating an engine speed signal from an engine speed sensor, generating an air/fuel ratio signal from an exhaust gas oxygen sensor, decreasing the amount of fuel delivered to the engine in response to a rich air/fuel ratio indication, and increasing the amount of fuel delivered to the engine in response to a lean air/fuel ratio indication, wherein the rate of decrease or increase of fuel is incrementally adjusted in accordance with the engine speed. In another embodiment, the fuel flow rate is adjusted by a stepper motor-actuated control valve which regulates the amount of fuel delivered to the engine.

One advantage of the disclosed system is its fine control of the air/fuel mixture around any predetermined air/fuel ratio. This fine control of the air/fuel ratio, adjusted in relation to engine speed, allows the system to be operated in the lean region without sensitivity to back-firing.

Another advantage of the present system is that it provides equivalent or improved fuel economy and emissions versus gasoline powered systems without degradation in engine power and torque.

Other objects and advantages of the invention will become apparent upon reading the following detailed description and appended claims, with reference to the accompanying drawings.

BRIEF DESCRIPTION OF THE DRAWINGS

For a more complete understanding of this invention, reference should now be had to the embodiment illustrated in greater detail in the accompanying drawings and described below by way of example of the invention.

DESCRIPTION OF THE PREFERRED EMBODIMENT

Figure 1:
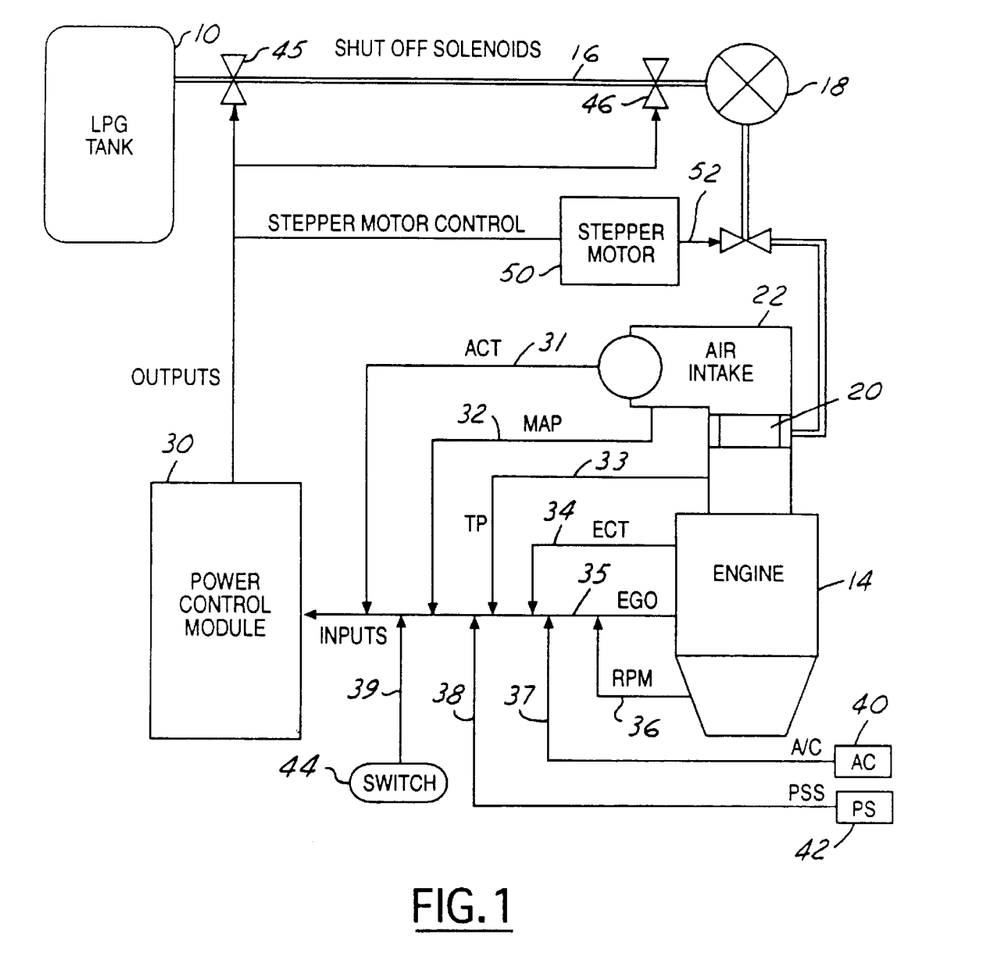
FIG. 1 shows a fuel control system for controlling the fuel delivered to an internal combustion engine in accordance with the present invention.

Referring now to the drawings, a preferred fuel control apparatus in accordance with the present invention is shown in FIG. 1. The apparatus is particularly adapted for use in vehicles powered by fuels such as liquid propane gas (LPG). A tank 10 containing LPG supplies fuel to the combustion chamber of an engine 12 via supply conduit 16, liquid-to-gas converter 18, mixer 20, and throttle body 14. After passing through the converter 18, the LPG is in a gaseous state and flows through the mixer 20 where it is combined with air from the air intake 22 which flows through the throttle body 14 and then into the engine 12 to form an air/fuel mixture.

The amount of fuel delivered to the mixer 20 is controlled by a power control module 30 responsive to signal inputs 31–39. Signal input 31 provides a measure of air charge temperature (ACT) at the air intake 22. Signal input 32 provides a measurement of the manifold absolute pressure (MAP) representing the engine load. Signal input 33 provides a throttle position reference signal (TP). Signal input 34 provides a measure of engine coolant temperature (ECT). Signal input 35 provides a measure of the oxygen level in the engine exhaust as sensed by an exhaust gas oxygen (EGO)

sensor. Signal input 36 provides a measurement of the engine speed in revolutions per minute (RPM). Signal input 37 provides a measurement of air conditioning (A/C) load from the air conditioning unit 40 of the vehicle when in operation. Signal input 38 provides a measurement of power steering (PSS) load from the power steering unit 42 of the vehicle. Finally, signal input 39 indicates the position of the LPG enable switch 44.

The power control module 30 processes the signal inputs 31–39 to regulate the flow of fuel to the engine 12 by controlling the gas control output solenoids 45, 46 and the stepper motor 50. The stepper motor 50 is operatively connected to a pintle-type control valve 52 for regulating the flow of fuel through the conduit 16 to the mixer 20 of the engine 12. For example, the pintle of the control valve can be retracted to open the control valve and increase the fuel flow to the engine 12, and advanced to close the control valve and decrease the fuel flow to the engine 12. The stepper motor 50 can be any conventional stepper motor, such as the Series 95000 Digital Linear Actuator available from Philips Electronics.

The stepper motor 50 is driven by the power control module 30 under closed-loop control responsive to the EGO signal input 35 and the engine speed input 36. The EGO signal input 35 is a two state signal wherein a first or high voltage state of the EGO signal indicates that the exhaust gases correspond to a richer than desired air/fuel ratio and a second or low voltage state when the exhaust gases correspond to a leaner than desired air/fuel ratio. Typically the desired air/fuel ratio is selected at or near stoichiometry. During lean burn air/fuel operating modes, however, the desired air/fuel ratio is preferably selected at a value considerably leaner than stoichiometry to achieve improved fuel economy.

Figure 2:
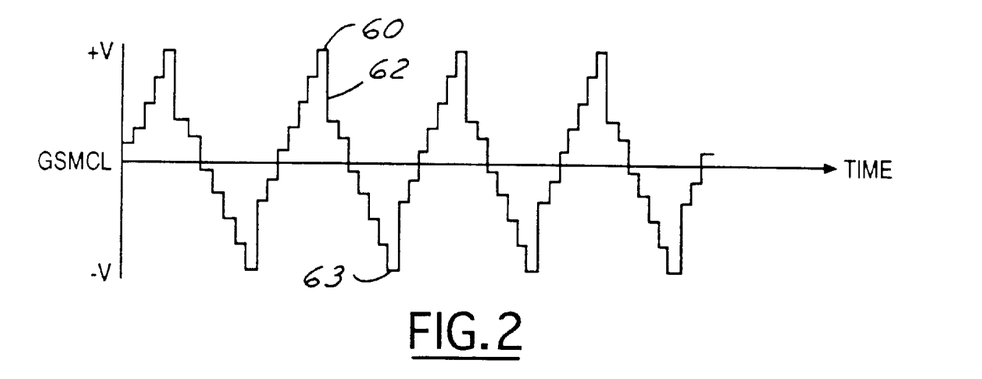
FIG. 2 is a graph representing the LPG fuel control stepper motor movement as a function of time in accordance with the present invention.

FIG. 2 is a graphical representation of the stepper motor movement as a function of time wherein the direction is responsive to the EGO signal input. In FIG. 2, the horizontal axis represents the EGO switch point with respect to time. As the stepper motor moves in a given direction based on the EGO polarity, the change in fuel flow responsive to the stepper motor movement eventually causes the EGO to switch polarity as the air/fuel mixture passes through stoichiometry, thereby causing the power control module to reverse the direction of the stepper motor after the stepper motor has stepped to its programmable peak value as shown in FIG. 2 at 63. For example, when the gas stepper motor control logic is indicating a positive value for the EGO signal (a rich air/fuel mixture), after a peak value 60 (GSMPEAK) has been reached by the stepper motor, the stepper motor will reverse to begin restricting the fuel supply to the engine. At this reversal point, it is possible to quickly step the motor in the opposite direction for a calibrated number of steps before continuing under closed-loop control as before. This is shown in FIG. 2 as jump-back point 62.

Figure 6A:
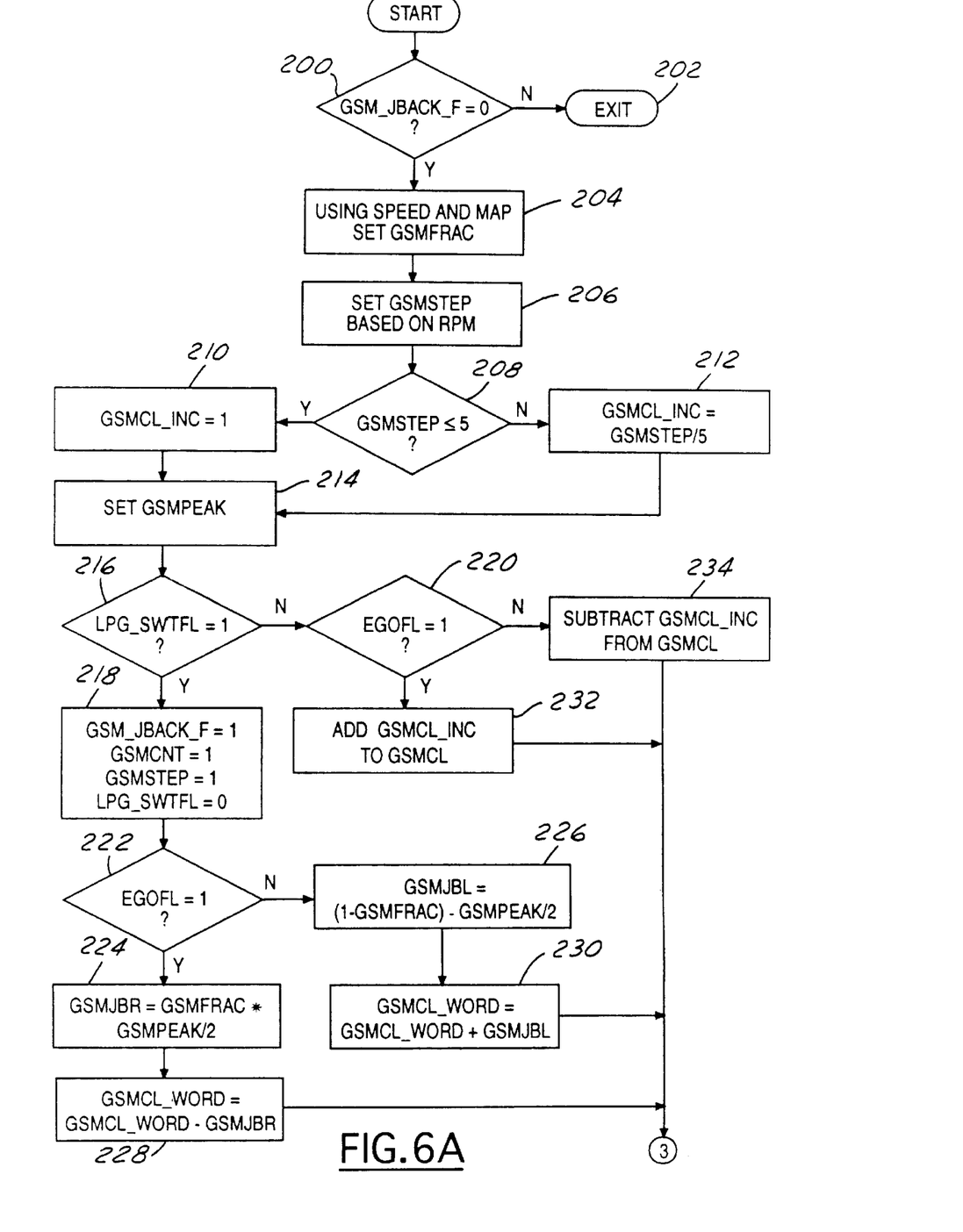
FIGS. 6A and 6B are flowcharts showing the operation of the closed-loop control logic of a preferred embodiment of the invention.
Figure 6B:
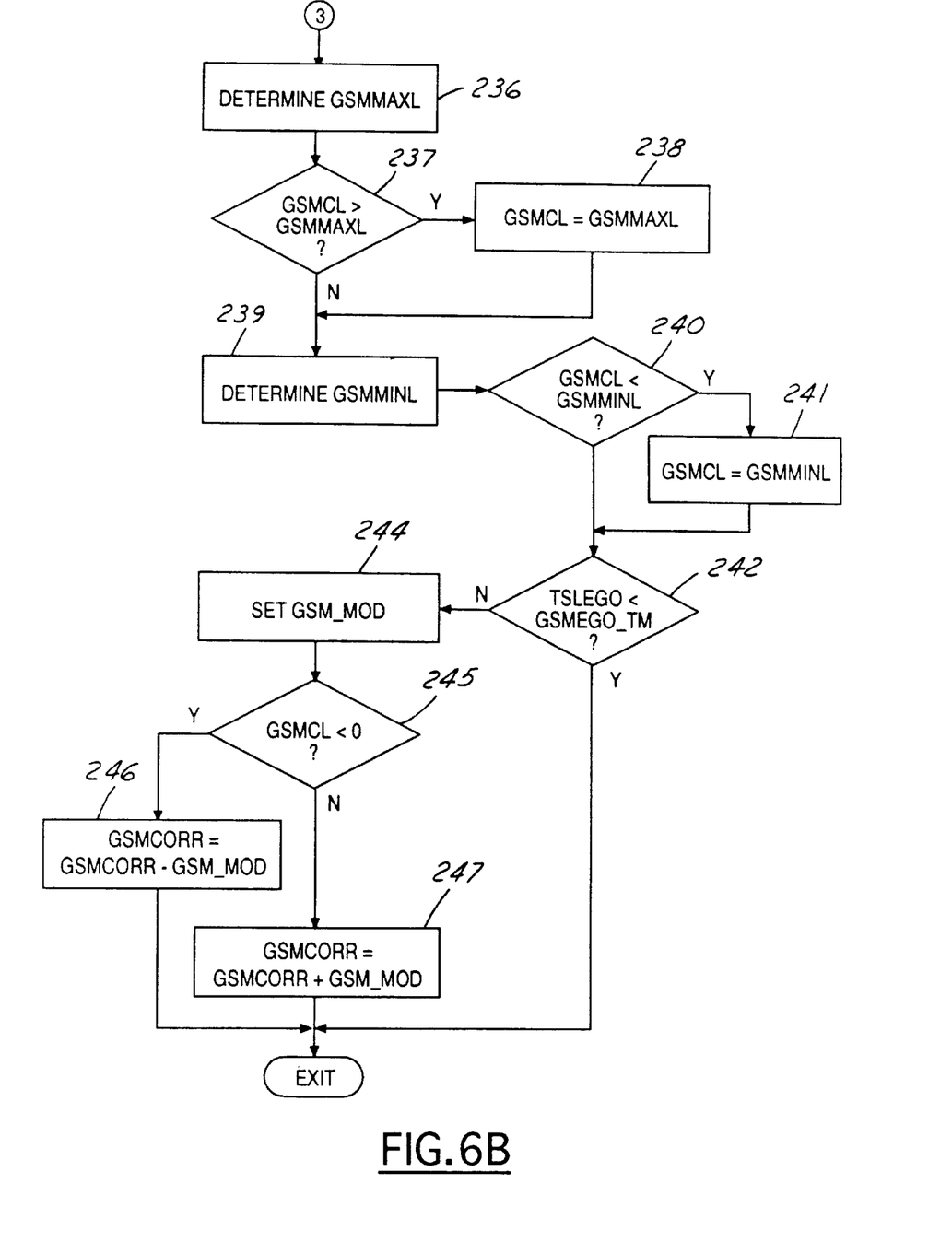

One goal of the stepper motor control logic is to accurately control the EGO switch times to meet desired emissions levels and improve fuel economy by achieving improved fuel control. To control the EGO switch times, a software modifier can be added to the stepper motor control logic signal. Thus, if the EGO switch times are long, the modifier can be used to increase the stepper motor movement and, therefore, reduce the switch time of the EGO sensor. Alternatively, if the switch times are too short, the modifier can be used to decrease the stepper motor movement and achieve the opposite effect. This is explained in further detail below with reference to FIG. 6.

Figure 3A:
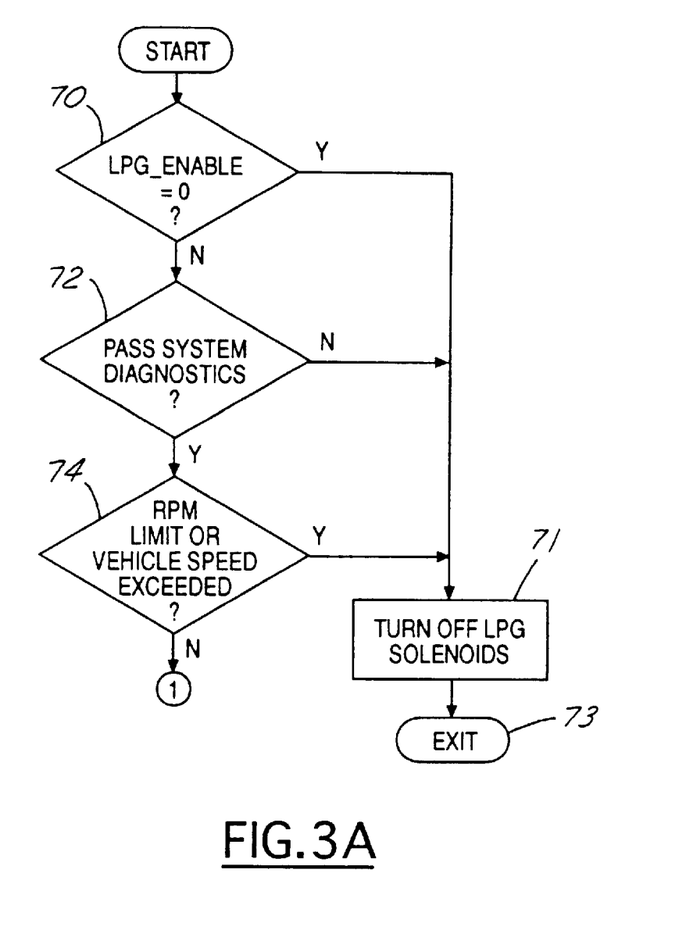
FIGS. 3A and 3B are flowcharts showing the operation of the background logic of a preferred embodiment of the invention.
Figure 3B:
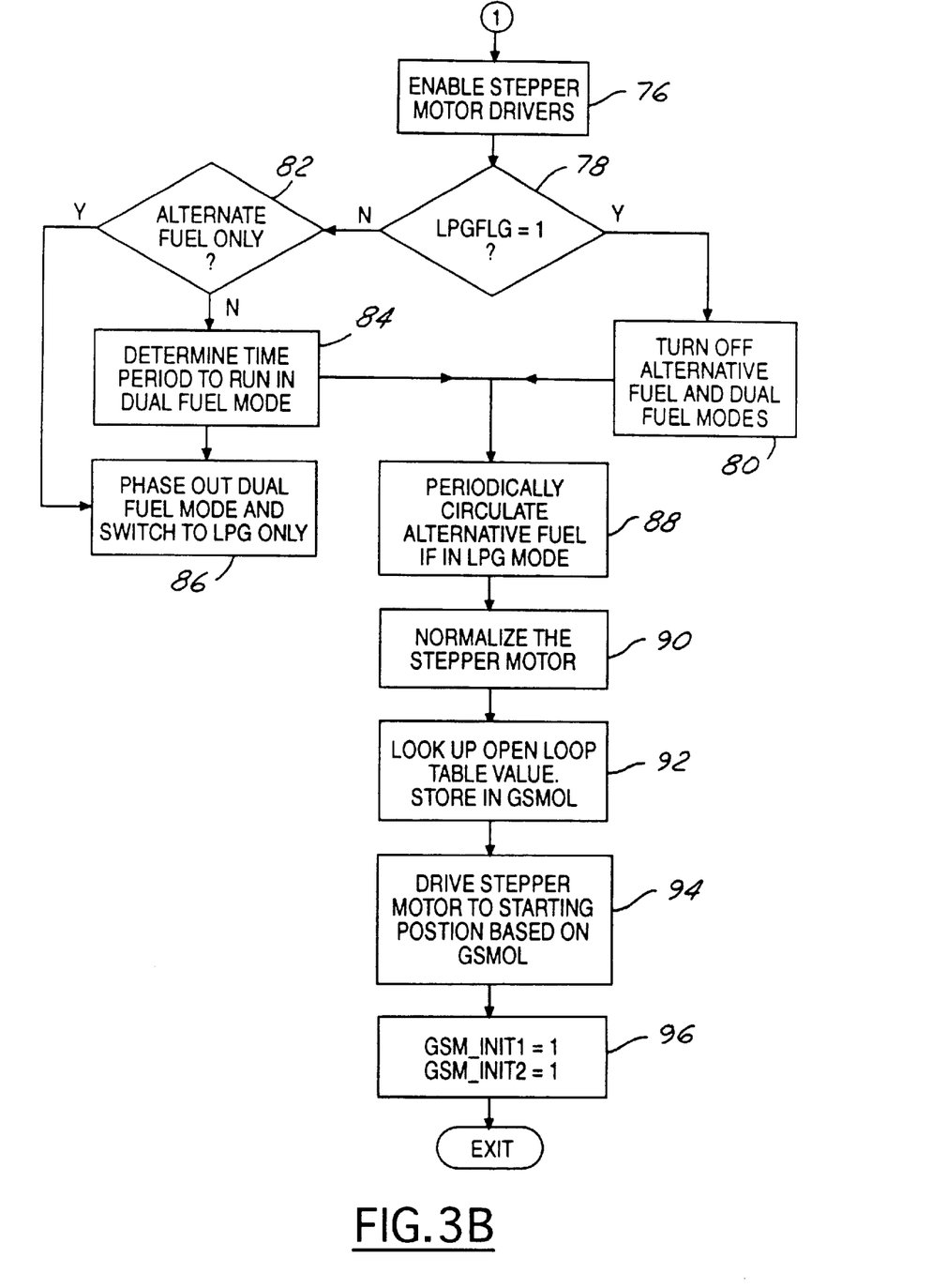

The LPG fuel delivery routine executed by the power control module 30 for controlling the stepper motor 50 and engine air/fuel ratio is now described beginning with reference to the flowchart shown in FIGS. 3a–3b, which illustrate the background logic executed by the power control module 30. The background logic controls the solenoids 45, 46 and drives the stepper motor 50 to its initial position.

The fuel control logic described herein was designed for vehicles which also have the capability to operate on conventional fuels such as gasoline either simultaneously with LPG or exclusively. Accordingly, the background logic contains checks on the status of the fuel select switch 44 (FIG. 1) to insure that LPG mode is selected, and contains logic for changing from an alternative fuel, for example gasoline, to LPG. During LPG operation, the background logic also cycles the alternative fuel source, such as the gasoline tank, to keep it from stagnating while operating in the LPG only mode and to prevent vapor lock when in gasoline mode.

FIG. 3a depicts a series of checks which are preferably made before operating the engine in LPG mode. This background logic routine is executed approximately every 50 milliseconds. At decision block 70, the software flag LPG_ENABLE is analyzed. If LPG_ENABLE is equal to zero (not set), then the engine is operating on a fuel other than LPG. Accordingly, the logic turns off the LPG solenoids 45, 46 and exits the software routine at blocks 71 and 73. If the LPG_ENABLE flag is set, the logic performs a series of system diagnostics at decision block 72. These diagnostic tests include such things as determining whether or not the engine is running and the fuel switch 44 is in the LPG mode. If these initial checks are not satisfied, the routine turns off the LPG solenoids 45, 46 at block 71 and exits the program at block 73. If the system diagnostics tests pass, the engine speed and the vehicle speed are analyzed in decision block 74. If either of these exceed respective associated units, the LPG solenoids are turned off at step 71 and the logic routine is terminated at block 73. If the RPM limit and vehicle speed limit are not exceeded, the stepper motor drivers are enabled in block 76 of FIG. 3b. The LPG flag is checked at decision block 78. If the engine is operating in LPG only mode, then the alternative fuel and dual fuel modes are turned off at step 80. If the engine is operating in a mode other than the LPG only mode, decision block 82 and steps 84 and 86 determine how long the engine is to be operated on the alternative fuel and subsequently dual fuels before switching to LPG only mode. If the engine is operating in LPG only mode for a period of time (for example, 15 minutes), it is desirable to circulate the alternative fuel, such as gasoline, periodically to prevent stagnation or vapor lock. This is performed at step 88. The stepper motor is then normalized at step 90 for the current speed (RPM) and load (MAP) conditions of the engine.

Prior to operating the engine under closed-loop control, an initial starting position for the stepper motor 50 is determined. This is performed at step 92. The variable GSMOL specifies the stepper motor starting position based on an open-loop look-up table value. The open-loop table values are found as a function of the engine speed (RPM) and load (manifold absolute pressure, MAP) based upon values predetermined on a dynamometer so as to provide reasonable initial closed-loop switch points for various speed and load conditions. In step 94, the stepper motor is driven to its initial position based on the value of GSMOL. The stepper motor initialization flags GSM_INIT1 and GSM_INIT2 are both set to indicate that the stepper motor has been initialized. Once the stepper motor has been initialized, the background logic is complete.

Figure 4:
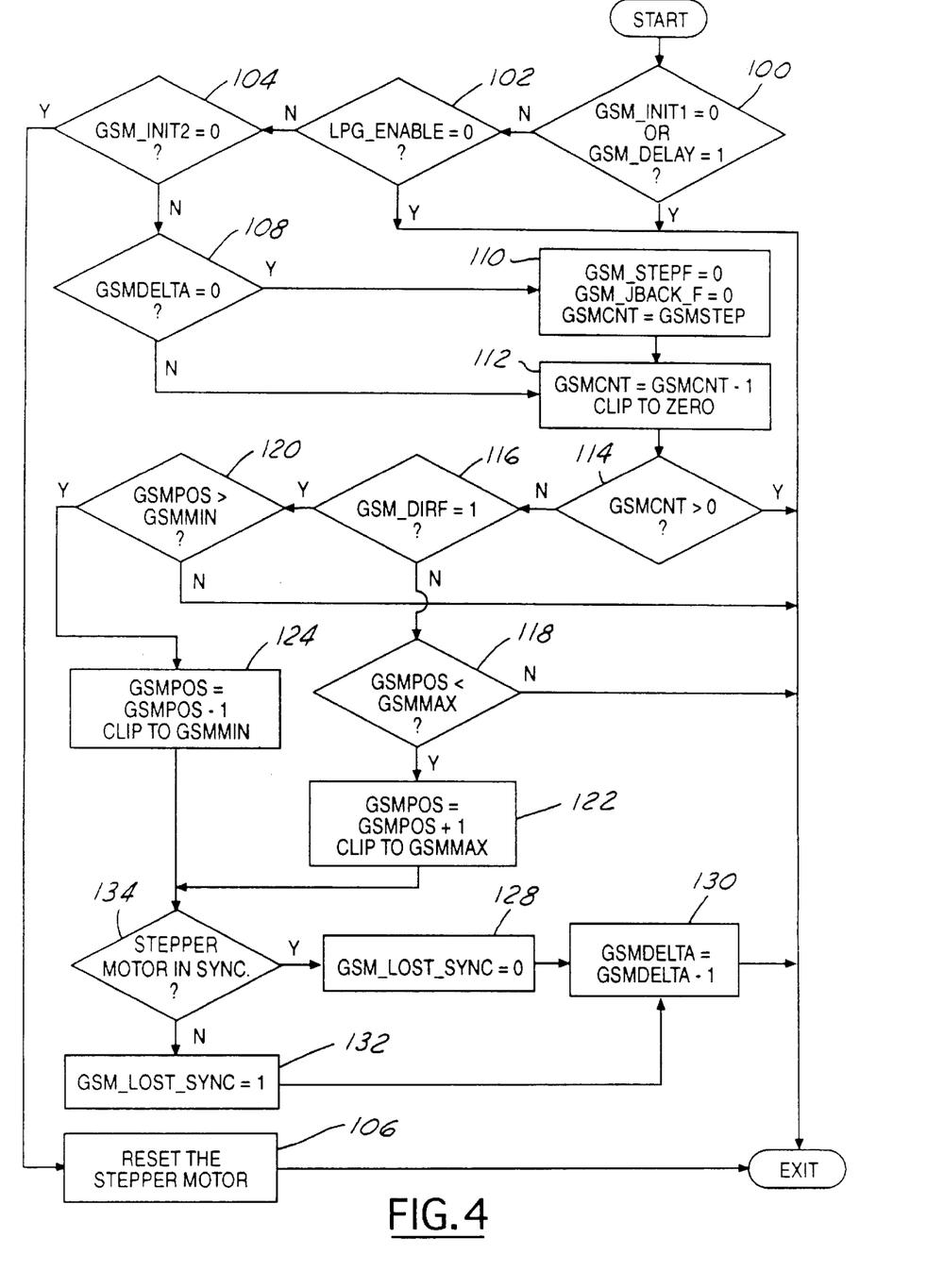
FIG. 4 is a flowchart showing the operation of the foreground logic of a preferred embodiment of the invention.

The power control module foreground logic will now be described with reference to FIG. 4. The foreground logic is executed at a 4 millisecond clock rate and is used to control the stepper motor. Therefore, if the stepper motor is activated every cycle, the maximum step rate of the stepper motor is 250 steps per second.

The foreground logic determines the direction and the rate to drive the stepper motor. In block 100, the foreground logic routine begins by determining whether the stepper motor has not been initialized, or a delay has been set to prohibit stepper motor output, in which case the foreground logic is not executed. This condition would result if the background logic had not successfully executed. Otherwise, in decision block 102, if the LPG_ENABLE flag is not set, indicating that the engine is not operating in the LPG-only mode, then the foreground logic is also terminated. Otherwise, in decision block 104, if the stepper motor initialization flag GSM_INIT2 is not set, then the stepper motor is reset at step 106 and the routine is terminated. The stepper motor reset typically occurs at each engine restart and fuel changeover from the alternative fuel, such as gasoline, to LPG. During stepper motor reset, the stepper motor is stepped at its fastest rate to a fully advanced (valve closed) position.

If the stepper motor has been initialized, it is then determined at decision block 108 whether the current stepper motor position is different from the desired stepper motor position (GSMDELTA=0?). If the desired position and the actual position of the stepper motor is the same (GSMDELTA=0), then the variables GSM_STEPF and GSM_JBACKF are set to zero at step 110. This indicates that the stepper motor is not moving and is not performing a jump-back routine. Additionally, the variable GSMCNT is set equal to GSMSTEP.

The variables GSMSTEP and GSMCNT are used to reduce the step rate of the stepper motor. GSMSTEP is a function calibrated to the engine speed (RPM). GSMSTEP controls the step rate of the stepper motor. In this example, GSMSTEP varies between the maximum step rate of 250 steps/sec at higher engine speeds to less than 5 steps/sec at lower engine speeds such as around idle. Because the foreground logic routine is executed every 4 milliseconds, the variable GSMCNT acts as a 4 millisecond delay in activating the stepper motor. Thus, a GSMCNT value of zero equates to a 4 millisecond step time, or a step rate of 250 steps per second.

If GSMDELTA≠0 in decision block 108, it indicates that the stepper motor must be stepped because the desired stepper motor position is different from the current stepper motor position. As stated above, the variable GSMCNT acts as a delay to determine when the stepper motor will be repositioned. This is carried out in decision blocks 112 and 114. As long as GSMCNT>0, the stepper motor is not activated. Thus, for example, if GSMCNT=5 and GSMDELTA≠0, the foreground logic would execute 5 times (or a 20 millisecond delay) before the stepper motor would be activated. When GSMCNT is equal to 0 (zero) in decision block 114, the direction of the stepper motor movement is determined in decision block 116. If the variable GSM_DIRF is equal to one, then the stepper motor is moving in a reverse or retracting direction.

Decision blocks 118 and 120 advance or retract the stepper motor in cooperation with steps 122 and 124, respectively. In decision blocks 118 and 120, if the stepper motor position (GSMPOS) is at its maximum or minimum position, respectively, the logic routine is terminated. Otherwise, the stepper motor position is advanced or retracted respectively at steps 122 and 124. After the stepper motor is advanced or retracted, decision block 134 determines whether the actual stepper motor position is synchronized with the calculated stepper motor position.

Figure 5A:
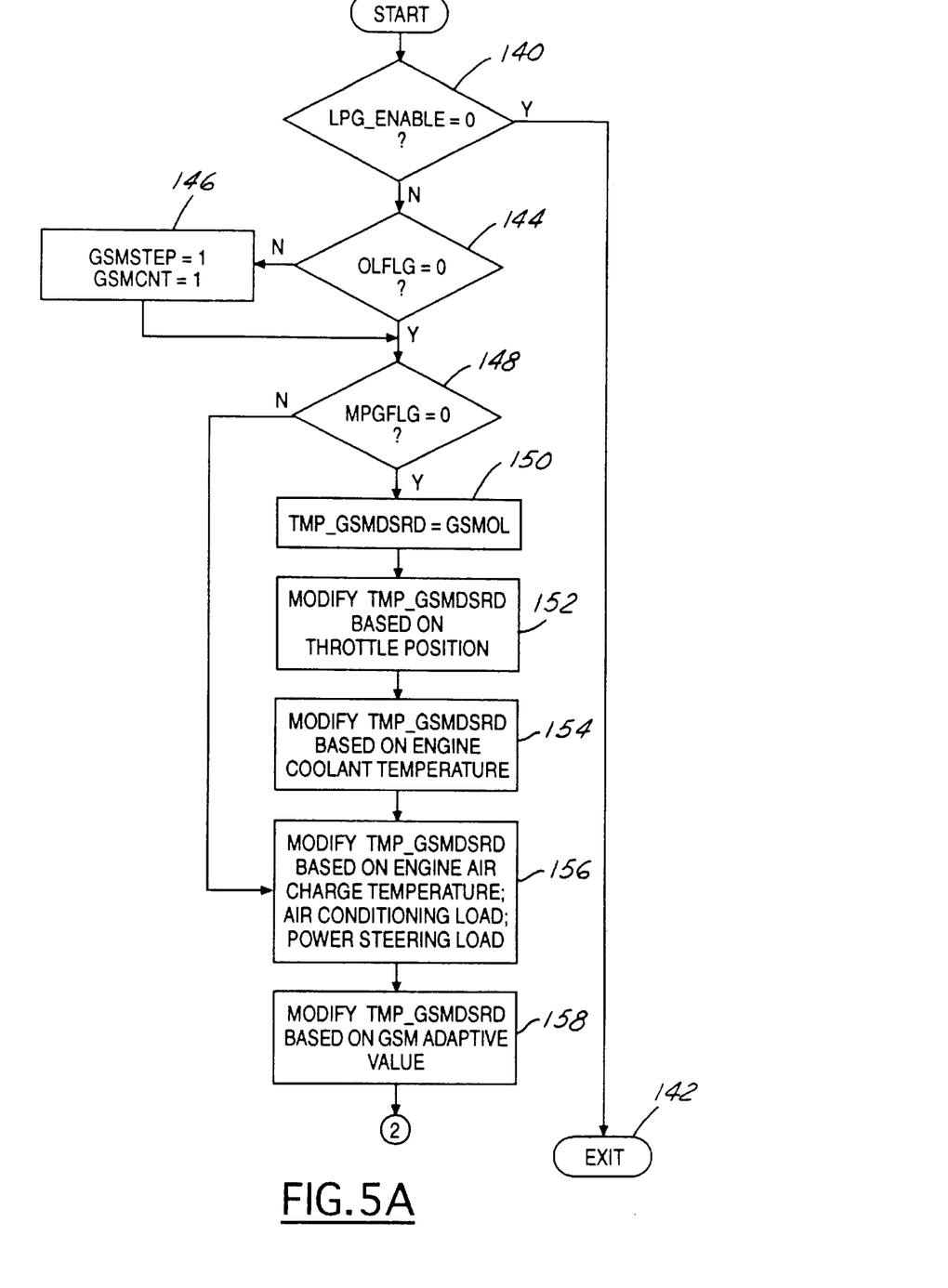
FIGS. 5A and 5B are flowcharts showing the operation of the midground logic of a preferred embodiment of the invention.
Figure 5B:
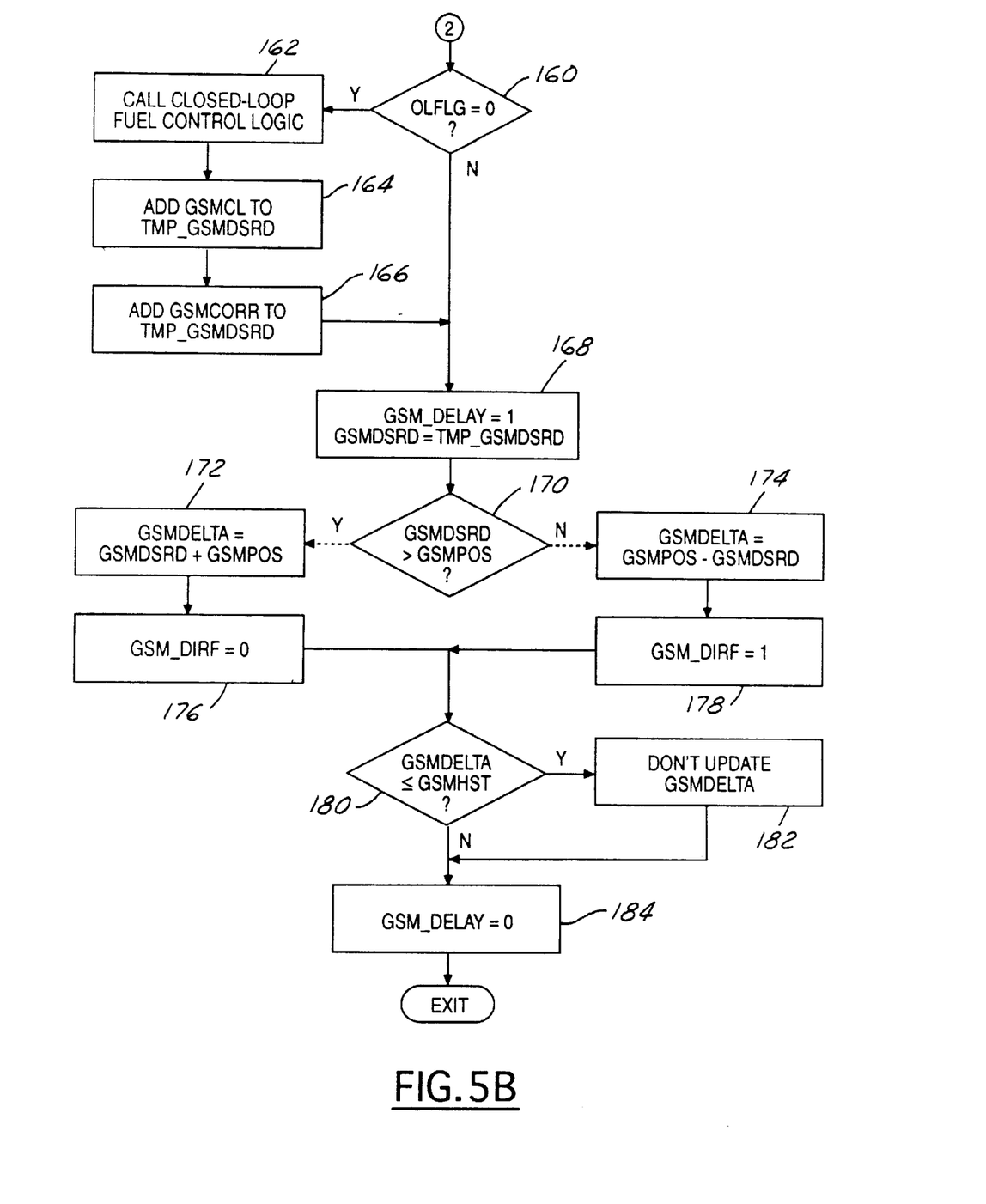

Referring to FIGS. 5a and 5b, the LPG mid-ground fuel control logic routine is executed exactly every 20 milliseconds. The LPG mid-ground fuel control routine calculates the final desired stepper motor position, and, if the system is in closed-loop fuel control, it also calculates the closed-loop correction factor for the stepper motor based on the EGO switch times. This routine allows the stepper motor position to be modified based on various inputs.

At decision block 140, the routine determines whether the system is operating in a LPG-only mode, or is operating on an alternative fuel. If the system is not in LPG-only mode, the routine is terminated at step 142. Otherwise, the routine determines at decision block 144 whether the stepper motor is operating under open-loop or closed-loop control. If the variable OLFLG is set to one, the system is operating under open-loop control and therefore the variables GSMSTEP and GSMCNT will be set to one, at step 146, to allow the stepper motor to be stepped at its fastest rate. This corresponds to a rate of 250 steps per second for the stepper motor because the foreground logic driving the stepper motor is executed once every four milliseconds.

At decision block 148, the logic determines whether or not the system is in the lean cruise mode. If the variable MPGFLG does not equal zero, the system is operating in the lean-cruise mode and the logic routine continues to step 156. Otherwise, at step 150, the register TMP_GSMDSRD is set equal to the open-loop look-up table value (GSMOL) for the current engine speed and load conditions. The variable TMP_GSMDSRD represents a temporary register for the desired stepper motor position. This temporary register is then modified based on various inputs at steps 152, 154, 156 and 158.

At step 152, the desired stepper motor position is modified based on the throttle position. Similarly, at steps 154 and 156 the desired stepper motor position is modified based on the current engine coolant temperature, engine air charge temperature, air conditioning load, or power steering load. With regard to throttle position, an engine operating in LPG mode at higher vehicle speeds can be sensitive to a sudden closed throttle position when not in the lean cruise mode. Therefore, the stepper motor position is compensated to avoid engine backfire. Similarly, with respect to power steering load, vehicle speed should be monitored since, at low speeds, there may be insufficient torque to compensate for the power steering load.

The adaptive value in step 158 is based on a correction factor established during closed-loop operation (GSMCORR). The correction factor is rolled into an adaptive table one step at a time at a rate determined by the system calibration. As the adaptive value is updated by one, the corresponding correction factor is reduced by the same amount to maintain system equilibrium. This adaptive value is used to compensate for initial incorrect base-level stepper motor calibration and for later component aging. Thus, in the open-loop mode, the adaptive value can modify the open-loop look-up table value to improve subsequent stepper motor initial positioning. Decision block 160 determines whether the system is in open-loop or closed-loop mode. If open-loop mode is indicated, the logic continues to step 168 (see FIG. 5b), otherwise, the system is in closed-loop operation. If the system is in closed-loop control, it calls the closed-loop logic routine, and adds the closed-loop adder (GSMCL) and correction factor (GSMCORR) to the variable TMP_GSMDSRD at steps 162, 164 and 166, respectively. In step 164, the variable GSMCL represents the gas stepper motor closed-loop control note adder having a resolution of one step. In step 166, the variable GSMCORR represents the gas stepper motor closed-loop correction factor.

In step 168, as shown in FIG. 5b, the stepper motor desired position (GSMDSRD) is set equal to the temporary register for the desired stepper motor position (TMP_GSMDSRD). Additionally, the stepper motor output is inhibited by setting the variable GSM_DELAY.

Decision block 170 compares the desired stepper motor position with the current stepper motor position (GSMPOS). The difference between the desired position and the current stepper motor position is stored in the variable GSMDELTA at steps 172 or 174 for use in the foreground logic routine to advance or retract the stepper motor. The gas stepper motor direction flag is, accordingly, set to advance (GSM_DIRF≠0) or retract (GSM_DIRF=1) at steps 176 and 178, respectively. A hysteresis feature is implemented at decision block 180. Thus, if the stepper motor is set to move (GSMDELTA≠0) by less than the hysteresis amount (GSMHYST), the stepper motor position will not be updated (step 182). Otherwise, the stepper motor inhibit flag is cleared at step 184 and the stepper motor is positioned based on GSMDELTA as explained above with reference to the foreground logic.

Referring to FIGS. 6a and 6b, the closed-loop fuel control logic is called from step 162 (FIG. 5b) and is only executed if the open-loop flag (OLFLG) is clear. Decision block 200 determines whether, after a switch point, the stepper motor is being jumped back in the opposite direction. If so, the closed-loop logic routine is terminated at block 202. If the system is not in jump-back mode, then the variable GSM-FRAC is set at block 204 based on the engine speed (RPM) and manifold absolute pressure (MAP). The variable GSM-FRAC is the stepper motor jump-back fraction. This variable allows the system to be operated in a rich or lean air/fuel ratio region, as will be described below.

The rate the stepper motor moves is controlled by a calibrateable function which has engine speed (RPM) as its input. In this example, the maximum step rate is set to 250 steps per second. However, at slower engine speeds, such as around idle, this is reduced to 12 steps per second. This step rate is set in the variable GSMSTEP at block 206. Based on the step rate (GSMSTEP), an increment is calculated to be added to the stepper motor position. If the step rate is less than or equal to five (block 208) indicating a very low engine speed, then the stepper motor increment is set to one (step 210). In other words, the incremental adder is set to the minimum amount that the stepper motor can move, i.e., 0.004 of a step. If the step rate is greater than five, the incremental adder is set to equal the step rate divided by five (block 212).

The peak-to-peak stepper motor value (shown between peak 60 and peak 63 of FIG. 2) is set as variable GSMPEAK at block 214. The peak-to-peak value is related to the jump back mode as will be described below.

Decision block 216 checks the status of variable LPG_SWTFL corresponding to a switch flag for fuel control. This variable allows control of the stepper motor direction based on the EGO switch times. If the switch flag is set, then the jump-back routine is executed at step 218, otherwise the EGO is monitored for a switch at decision block 220.

Block 218 indicates that the logic is performing a jump-back routine (GSM_JBACK_F=1), sets the stepper motor count (GSMCNT) and step rate at their maximum values, and clears the switch flag. If the EGO flag is high at decision block 222, it indicates the air/fuel ratio is rich; if the EGO flag is low, it indicates an air/fuel ratio lean of stoichiometry.

The amount of the stepper motor jump-back is set in blocks 224 and 226. The jump-back rich (GSMJBR) and jump-back lean (GSMJBL) variables are set to a fractional amount of half the stepper motor peak-to-peak travel values. The amount of stepper motor movement toward lean or rich is set in blocks 228 and 230 respectively. The value stored in the variable GSMCL_WORD is used to position the stepper motor via block 164 of FIG. 5b wherein the variable GSMCL represents the high byte of GSMCL_WORD.

The jump-back mechanism is graphically represented in FIG. 2 wherein stepper motor movement 62 indicates a jump-back toward the lean region.

Returning to decision block 220 of FIG. 6a, if a switch point has not been reached (block 216) and the EGO flag is indicating operation in the rich region, then the incremental adder (GSMCL_INC) is added to the calculated stepper motor position (GSMCL) at block 232, otherwise the incremental value is subtracted from the calculated stepper motor position at block 234.

Once the calculated stepper motor position has been determined at blocks 232 or 234, blocks 236 through 241 (FIG. 6b) determine whether the calculated stepper motor position (GSMLCL) is outside the maximum or minimum range of stepper motor travel. If the calculated stepper motor position is outside of these ranges, it is set to the maximum or minimum travel limit to prevent an overlimit.

The time since the last EGO switch is compared to the desired EGO switch time at decision block 242. To control the EGO switch times, a modifier (GSM_MOD) is used with the stepper motor correction factor (GSM_CORR). Thus, if the EGO switch times are long, the correction factor is increased to increase the stepper motor movement and thus achieve a switch earlier. If the switch times are shorter than desired, the correction factor is reduced to decrease the stepper motor movement. The variable GSM_MOD is the adder based on the EGO switch times. Therefore, if GSMCL is positive, the modifier is added to the correction value; otherwise, the modifier is subtracted from the correction value. This is requested in blocks 244 through 247. This correction factor is then used to update the stepper motor position as shown in block 166 of FIG. 5b.

From the foregoing, it will be seen that a new and improved method and system for controlling the air/fuel ratio in an LPG-powered internal combustion engine has been disclosed. While the invention has been described in connection with one or more embodiments, it will be understood that the invention is not limited to those embodiments. On the contrary, the invention includes all alternatives, modifications, and equivalents as may be included within the spirit and scope of the appended claims.

What is claimed is:

1. A method of controlling the amount of fuel delivered to an internal combustion engine comprising the steps of:
   generating a first engine operating parameter signal;
   generating a second engine operating parameter signal;
   initially positioning a fuel flow valve based on an open-loop table value corresponding to said first and second engine operating parameter signals; and
   operating the engine under closed-loop control by adjusting the amount of fuel delivered to said engine in response to the output of an exhaust gas oxygen sensor and said first engine operating parameter signal to maintain a desired air/fuel ratio wherein the magnitude of the rate of change of said amount of fuel delivered is responsive to said first engine operating parameter signal and the switch time of said exhaust gas oxygen sensor, and the direction of said rate of change is responsive to said output of said exhaust gas oxygen sensor.

2. The method of controlling the amount of fuel delivered to an internal combustion engine as recited in claim 1 wherein said first engine operating parameter signal corresponds to the engine speed and said second engine operating parameter signal corresponds to the engine load.

3. The method of controlling the amount of fuel delivered to an internal combustion engine as recited in claim 1 wherein said fuel is liquid propane gas.

4. The method of controlling the amount of fuel delivered to an internal combustion engine as recited in claim 1 wherein the amount of fuel delivered to said engine is controlled by said fuel flow valve and the position of said fuel flow valve is controlled by a stepper motor.

5. The method of controlling the amount of fuel delivered to an internal combustion engine as recited in claim 4 wherein said step of operating the engine under closed-loop control includes the steps of deriving a stepper motor increment corresponding to said first engine operating parameter signal, and determining from said exhaust gas oxygen sensor whether said air/fuel ratio is rich or lean.

6. The method of controlling the amount of fuel delivered to an internal combustion engine as recited in claim 5 wherein said step of adjusting includes driving a stepper motor actuated control valve, by said stepper motor increment, toward a first position in response to said output of said exhaust gas oxygen sensor indicating a lean air/fuel ratio, and toward a second position in response to said output of said exhaust gas oxygen sensor indicating a rich air/fuel ratio, said control valve regulating the fuel flow to said engine.

7. A method of controlling the amount of fuel delivered to an internal combustion engine comprising the steps of:

generating a first engine operating parameter signal;

generating a second engine operating parameter signal;

initially positioning a fuel flow valve based on an open-loop table value corresponding to said first and second engine operating parameter signals wherein the amount of fuel delivered to said engine is controlled by said fuel flow valve and the position of said fuel flow valve is controlled by a stepper motor; and operating the engine under closed-loop control by adjusting the amount of fuel delivered to said engine in response to the output of an exhaust gas oxygen sensor and said first engine operating parameter signal to maintain a desired air/fuel ratio wherein the magnitude of the rate of change of said amount of fuel delivered is responsive to said first engine operating parameter signal, and the direction of said rate of change is responsive to said output of said exhaust gas oxygen sensor;

wherein said step of adjusting includes deriving a stepper motor increment corresponding to said first engine operating parameter signal, and determining from said exhaust gas oxygen sensor whether said air/fuel ratio is rich or lean, driving a stepper motor actuated control valve, by said stepper motor increment, toward a first position in response to said output of said exhaust gas oxygen sensor indicating a lean air/fuel ratio, and toward a second position in response to said output of said exhaust gas oxygen sensor indicating a rich air/fuel ratio, said control valve regulating the fuel flow to said engine; and wherein said stepper motor increment is further responsive to the switch time of said exhaust gas oxygen sensor to maintain a desired air/fuel ratio.

8. A method of controlling the amount of fuel delivered to an internal combustion engine comprising the steps of:

generating an engine speed signal from an engine speed sensor;

generating an air/fuel ratio signal from an exhaust gas oxygen sensor; and decreasing the amount of fuel delivered to said engine in response to said air/fuel ratio signal indicating a ratio richer than stoichiometry, and increasing the amount of fuel delivered to said engine in response to said air/fuel ratio signal indicating a ratio leaner than stoichiometry, the rate of said decrease and said increase being incrementally adjusted in a predetermined relationship to said engine speed signal and said rate being further modified in response to the switch time of said air/fuel ratio signal.

9. The method of controlling the amount of fuel delivered to an internal combustion engine as recited in claim 8 wherein said fuel is liquid propane gas.

10. The method of controlling the amount of fuel delivered to an internal combustion engine as recited in claim 8 wherein said steps of increasing and decreasing comprises the steps of driving a stepper motor activated control valve by said incremental adjustment toward a first position in response to said lean air/fuel ratio, and toward a second position in response to said rich air/fuel ratio, said control valve regulating the fuel flow to said engine.

11. A method of controlling the amount of fuel delivered to an internal combustion engine comprising the steps of:

generating an engine speed signal from an engine speed sensor;

generating an air/fuel ratio signal from an exhaust gas oxygen sensor; and decreasing the amount of fuel delivered to said engine in response to said air/fuel ratio signal indicating a ratio richer than stoichiometry, and increasing the amount of fuel delivered to said engine in response to said air/fuel ratio signal indicating a ratio leaner than stoichiometry, the rate of said decrease and said increase being incrementally adjusted in a predetermined relationship to said engine speed signal;

wherein said steps of increasing and decreasing comprises the steps of driving a stepper motor activated control valve by said incremental adjustment toward a first position in response to said lean air/fuel ratio, and toward a second position in response to said rich air/fuel ratio, said control valve regulating the fuel flow to said engine; and wherein said step of driving further includes stepping said motor a predetermined consecutive number of steps in response to a switch in said air/fuel ratio signal indication.

12. A method of controlling the amount of fuel delivered to an internal combustion engine comprising the steps of:

generating an engine speed signal from an engine speed sensor;

generating an air/fuel ratio signal from an exhaust gas oxygen sensor; and decreasing the amount of fuel delivered to said engine in response to said air/fuel ratio signal indicating a ratio richer than stoichiometry, and increasing the amount of fuel delivered to said engine in response to said air/fuel ratio signal indicating a ratio leaner than stoichiometry, the rate of said decrease and said increase being incrementally adjusted in a predetermined relationship to said engine speed signal;

wherein said steps of increasing and decreasing comprises the steps of driving a stepper motor activated control valve by said incremental adjustment toward a first position in response to said lean air/fuel ratio, and toward a second position in response to said rich air/fuel ratio, said control valve regulating the fuel flow to said engine; and wherein said step of driving further includes modifying said incremental adjustment to increase said stepper motor increments in response to a slower than desired switch time of said exhaust gas oxygen sensor, and decrease said stepper motor increment in response to a faster than desired switch time of said exhaust gas oxygen sensor.

13. A closed-loop control method of delivering fuel to a dual-mode internal combustion engine comprising the steps of:

detecting an alternate fuel mode signal of said engine, and, in response;

generating an engine speed signal from an engine speed sensor;

generating an air/fuel ratio signal from an exhaust gas oxygen sensor; and incrementally adjusting a stepper motor in a predetermined relationship to said engine speed signal and said air/fuel ratio signal, said stepper motor activating a control valve regulating the flow of fuel to said engine.

14. A closed-loop control method according to claim 13 wherein said fuel is liquid propane gas.

15. A system for delivering a supply of liquid propane gas to an internal combustion engine comprising:

a fuel supply of liquid propane gas;

a speed sensor for generating a signal indicative of the speed of said engine;

an exhaust gas oxygen sensor for generating a signal indicative of the air/fuel ratio delivered to said engine;

a control valve connected to said fuel supply and regulating the flow of said fuel to said engine; and a stepper motor connected to said control valve wherein said stepper motor incrementally operates said control valve in response to said speed sensor and said exhaust gas oxygen sensor output said incremental operation being modified in response to the switch time of said exhaust gas oxygen sensor signal.

* * * * *